United States Patent
Elogab et al.

(10) Patent No.: US 10,414,449 B2
(45) Date of Patent: Sep. 17, 2019

(54) METHOD AND SYSTEM FOR REDUCING DRAG IN A VEHICLE

(71) Applicant: Osama Elogab, Taunton (GB)

(72) Inventors: Osama Elogab, Taunton (GB); Hatem Elogab, Taunton (GB)

(73) Assignee: 06AB LIMITED, Rumwell, Great Brittain (GB)

(*) Notice: Subject to any disclaimer, the term of this patent is extended or adjusted under 35 U.S.C. 154(b) by 0 days.

(21) Appl. No.: 15/555,072

(22) PCT Filed: Mar. 2, 2016

(86) PCT No.: PCT/GB2016/050549
§ 371 (c)(1),
(2) Date: Aug. 31, 2017

(87) PCT Pub. No.: WO2016/139472
PCT Pub. Date: Sep. 9, 2016

(65) Prior Publication Data
US 2018/0037276 A1    Feb. 8, 2018

(30) Foreign Application Priority Data

Mar. 5, 2015 (GB) .................................. 1503719.5
Apr. 17, 2015 (GB) .................................. 1506537.8

(51) Int. Cl.
*B62D 35/00* (2006.01)
*B62D 37/02* (2006.01)
*F01N 13/08* (2010.01)

(52) U.S. Cl.
CPC ........... *B62D 35/001* (2013.01); *B62D 37/02* (2013.01); *F01N 13/08* (2013.01); *F01N 2340/06* (2013.01)

(58) Field of Classification Search
CPC .............................. B62D 35/001; B62D 37/02
(Continued)

(56) References Cited

U.S. PATENT DOCUMENTS

| 2,725,944 A | 12/1955 | Lee et al. |
| 4,006,932 A | 2/1977 | McDonald |

(Continued)

FOREIGN PATENT DOCUMENTS

| DE | 2935324 A1 | 3/1981 |
| DE | 4000039 A1 | 7/1991 |

(Continued)

OTHER PUBLICATIONS

Srisha M. V. Rao and G. Jagadeesh, Novel Supersonic nozzles for mixing enhancement in supersonic ejectors, Applied Thermal Engineering, Jun. 12, 2014, 71.

(Continued)

*Primary Examiner* — Jason S Morrow
(74) *Attorney, Agent, or Firm* — Crose Law LLC; Bradley D. Crose (57) ABSTRACT

One of the major causes of drag in vehicles is due to the low pressure and/or turbulent vortex region behind the vehicle. In some vehicles multiple smaller vortices may form around the vehicle, and elimination of these through shaping of bodywork of vehicles is common practice to increase efficiency of the vehicle. A vehicle is provided configured such that, when moving at a speed above a predetermined threshold speed, at least one turbulent and/or low pressure region (190) is formed adjacent to the vehicle, the vehicle comprising: at least one propelling nozzle (200) located adjacent to the at least one region; and a system for providing gas to the at least one nozzle (200) for expulsion into the at least one region (190).

10 Claims, 10 Drawing Sheets

(58) Field of Classification Search
USPC .................................................. 296/180.4
See application file for complete search history.

(56) References Cited

U.S. PATENT DOCUMENTS

| | | | |
|---|---|---|---|
| 4,384,630 A | 5/1983 | Steiner | |
| 4,460,055 A | 7/1984 | Steiner | |
| 4,665,704 A | 5/1987 | Hartwig | |
| 5,908,217 A | 6/1999 | Englar | |
| 6,470,680 B1 | 10/2002 | Janeke | |
| 6,779,834 B1* | 8/2004 | Keller | B62D 35/001 |
| | | | 296/180.4 |
| 8,671,671 B1 | 3/2014 | Spencer-Smith et al. | |
| 2003/0038508 A1* | 2/2003 | Fairburn | B62D 35/001 |
| | | | 296/208 |
| 2005/0150210 A1 | 7/2005 | Hergemoller et al. | |
| 2006/0046894 A1 | 3/2006 | Kyle | |
| 2007/0187990 A1* | 8/2007 | Shahbazi | B62D 35/00 |
| | | | 296/180.1 |
| 2009/0293474 A1 | 12/2009 | Lucia | |
| 2010/0089056 A1 | 4/2010 | Cooper et al. | |
| 2010/0326411 A1 | 12/2010 | Perovic | |
| 2013/0140103 A1* | 6/2013 | Smith | B60K 11/06 |
| | | | 180/309 |
| 2016/0039477 A1* | 2/2016 | Ahmad | B62D 35/00 |
| | | | 244/53 B |
| 2016/0214661 A1* | 7/2016 | Knobloch | B62D 35/004 |
| 2017/0183043 A1* | 6/2017 | Connors | B62D 35/001 |
| 2018/0244325 A1* | 8/2018 | Harter | B62D 35/005 |

FOREIGN PATENT DOCUMENTS

| | | |
|---|---|---|
| DE | 19633205 A1 | 2/1998 |
| DE | 102008047488 A1 | 3/2010 |
| GB | 2068851 A | 8/1981 |
| GB | 2535577 A | 8/2016 |
| JP | 0533662 A | 2/1993 |
| WO | 8809737 A1 | 12/1988 |
| WO | 2009116932 A1 | 9/2009 |

OTHER PUBLICATIONS

IPO Search Report, dated Aug. 11, 2015.
International Search Report, dated May 19, 2016.
International Search Authority, written opinion, dated Sep. 9, 2016.
IPO Search Report, dated Jul. 15, 2016.
IPO Search & Exam report, dated Aug. 18, 2017.

* cited by examiner

METHOD AND SYSTEM FOR REDUCING DRAG IN A VEHICLE

The present invention relates generally to vehicles and a method of reducing drag experienced by vehicles moving at speed and finds particular, although not exclusive, utility in automobiles, cars, lorries, aeroplanes, trains and motorbikes.

Drag (also referred to as fluid resistance) experienced by moving vehicles of various different types comprises two main components: skin friction encountered in laminar flow, which is approximately proportional to the velocity of the vehicle in question; and form drag encountered in turbulent flow, which is approximately proportional to the square of the velocity of the vehicle. It is desirable to minimise the form drag of a vehicle, for instance by ensuring that the maximum proportion of the drag is due to skin friction. Turbulent flow around a vehicle occurs during flow separation, when a low pressure and/or turbulent vortex region is formed behind the vehicle, characteristic of a high Reynolds number in which turbulent flow dominates over laminar flow. In some vehicles multiple smaller vortices may form around the vehicle, and elimination of these through shaping of bodywork of vehicles is common practice to increase efficiency of the vehicle.

According to a first aspect of the present invention, there is provided a vehicle configured such that, when moving at a speed above a predetermined threshold speed, at least one turbulent and/or low pressure region is formed adjacent to the vehicle, the vehicle comprising: at least one propelling nozzle located adjacent to the at least one region; and a system for providing gas to the at least one nozzle for expulsion into the at least one region.

The propelling nozzle may be located at an exhaust and/or air outlet.

The gas referred to may be air, atmospheric air, engine exhaust, other gases, or a combination thereof.

The region may be behind the vehicle, behind the cabin of a lorry, or in any other low pressure region adjacent to the vehicle.

The propelling nozzle may comprise a convergent and/or a divergent propelling nozzle. The propelling nozzle may have a pressure ratio defined as the outlet pressure divided by the inlet pressure. In the case of a convergent nozzle, if the nozzle pressure ratio is above a critical value (typically between approximately 1.6:1 to 2:1, e.g. about 1.8:1), the nozzle will choke, resulting in some expansion to ambient pressure taking place downstream of the nozzle throat (i.e. the portion of the nozzle having the smallest cross-sectional flow area); that is, in the jet wake. In this way, the imbalance between the throat static pressure and ambient pressure generates some (pressure) thrust.

The propelling nozzle may be, for example, a convergent-divergent propelling nozzle, which may be a form of divergent propelling nozzle. In a convergent-divergent nozzle, expansion occurring downstream of the convergent nozzle section acts against the inside of the divergent nozzle portion.

The propelling nozzle may comprise an ejector nozzle.

The at least one propelling nozzle may comprise: at least one convergent propelling nozzle; and/or at least one divergent propelling nozzle.

The convergent propelling nozzle being configured to produce a relatively high velocity jet, for instance when compared to the velocity of gas introduced to the nozzle and/or the velocity of gas expelled from the divergent propelling nozzle.

The convergent nozzle may be located adjacent to a boundary of the region. That is, the convergent nozzle may be located to direct a jet of gas into a boundary/boundary-layer of the region. The region may be a turbulent boundary layer, and the boundary of the region may be the extent of the boundary layer. The convergent nozzle may be located such that the extent of the boundary layer is reduced.

In this way, the high velocity jet may eliminate the region boundary/vortex boundary/eddy line by inducing the gas therein to equalise speed with gas outside the region.

The divergent nozzle being configured to produce a relatively high pressure jet, for instance when compared to the pressure of gas introduced to the nozzle and/or the pressure of gas expelled from the convergent propelling nozzle.

The divergent nozzle may be spaced from a boundary of the region. That is, the divergent nozzle may be located to direct a jet of gas into the region, for instance into a central part of the region, a part of the region spaced from a boundary/boundary-layer of the region.

Where 'spaced' with reference to the location of the divergent nozzle may be viewed as a comparative term to 'adjacent to' with reference to the location of the convergent nozzle.

In this way, the high pressure jet may act to remove the low pressure region by expanding into said region.

The system may be configured to supply relatively high temperature gas to the convergent nozzle. The relatively high temperature gas may have a temperature of between 70 and 130 degrees centigrade, in particular between 90 and 120 degrees centigrade, more particularly approximately 110 degrees centigrade.

The system may be configured to supply relatively low temperature gas to the divergent nozzle. The relatively low temperature gas may have a temperature of between −50 and 10 degrees centigrade, in particular between −40 and −10 degrees centigrade, more particularly approximately −30 degrees centigrade.

The relatively high and the relatively low temperatures referred to may be relative to one another, and/or relative to ambient temperature and/or approximately 20 to 30 degrees centigrade. That is, the system may be configured to supply gas to the convergent nozzle at a temperature substantially higher than to the divergent nozzle.

The system may heat and/or cool gas to provide the relatively high and relatively low temperature gas by any conventional means, for instance, electrical heating, via heat form a coolant system of an engine within the vehicle, from a heat exchanger with for instance exhaust gases, from the heat of compression of gas, from cooling due to expansion of the gas, from a heat exchanger with ambient air, from a refrigeration system, from a liquid nitrogen storage system, or due to passage down a corrugated pipe/tube or due to passage down a pipe/tube having an uneven and/or non-smooth interior.

The system may comprise a vortex tube configured to split gas into a relatively high temperature stream and a relatively low temperature stream, and configured to convey the high temperature stream to the convergent nozzle and the low temperature stream to the divergent nozzle.

The vortex tube may be a Ranque-Hilsch vortex tube, for instance of any known configuration. In particular, the vortex tube may comprise a swirl chamber and/or a conical nozzle, as is well known in the art.

The system may comprise a pump (e.g. an air pump as described below) a compressor (e.g. an air compressor as described below) or any other system for providing gas and/or air to the region via the nozzles, preferably in a compressed form compared to ambient; this will be referred to herein as 'compressed air', but is intended to cover all stated possibilities unless otherwise stated. A pump may provide gas directly to a nozzle, or may provide gas to a vortex tube that may then provide a relatively hot gas stream to one nozzle and a relative cold gas stream to another nozzle. The pump may be in the form of a compressed air pump, or may be a compressor located at an engine inlet (for instance as is present in a turbo charger), where compressed air may be bled off before introduction into the engine.

The exhaust of an engine (e.g. an internal combustion engine) may provide gas (e.g. exhaust gas) directly to a nozzle, or may provide gas to a vortex tube that may then provide a relatively hot gas stream to one nozzle and a relatively cold gas stream to another nozzle.

In some embodiments, gas from a pump may be combined with bled-off and/or exhaust gas before being provided to a nozzle and/or a vortex tube in the manner described above. In alternative embodiments, relatively hot or cold gas streams from a vortex tube may be combined with bled-off and/or exhaust gas before being provided to a nozzle. In this way, noise due to the turbulent motion of the bled-off and/or exhaust gas can be reduced, thereby reducing overall engine noise. In particular, reducing the temperature of the exhaust gas reduces the sound energy carried with the exhaust gas. Combining the gas from the pump and/or vortex tube may be by mixing, for instance by providing the exhaust gas into gas flow (or vice versa) via a coaxial pipe arrangement and/or via a mixer nozzle, for instance a spray nozzle, a duplex nozzle and/or a sewer nozzle. The mixer nozzle may have a primary outlet that provides gas flow therethrough in a substantially continuous direction, and at least one secondary outlets that provide gas flow therethrough in a substantially deflected direction. The deflected direction may be between 10 and 170 degrees, for instance, approximately 15 degrees, 30 degrees, 70 degrees, 90 degrees, 110 degrees or 130 degrees.

In one embodiment, gas from the pump is split into a first stream that is directed to the vortex tube and a second stream that is delivered for combination with exhaust gas.

The gas after combination may have a relatively high or a relatively low temperature, and may be directed to an appropriate portion of the region as discussed above. Preferably, the combined gas has a relatively low temperature and is directed to a nozzle directed towards an interior portion of the region, spaced from a boundary of the region.

The propelling nozzle may accelerate the available gas to subsonic, sonic, or supersonic velocities. The internal shape may be convergent or convergent-divergent. The propelling nozzle may have a fixed geometry, or they may have variable (i.e. controllable) geometry to give different exit areas to control the characteristics of the propelling jet. The propelling nozzle may be an ejector nozzle; however, other nozzle configurations are contemplated.

The propelling nozzle may be a supersonic ejector, for instance a conical nozzle; however, a tip ring nozzle, or an elliptic sharp tipped shallow (ESTS) lobed nozzle, as described in "Novel supersonic nozzles for mixing enhancement in supersonic ejectors", Srisha M. V. Raoa & G. Jagadeesh, Applied Thermal Engineering, Volume 71, Issue 1, 5 Oct. 2014, Pages 62-71, the contents of which is incorporated by reference herein in its entirety. Such preferred arrangements provide enhance mixing over that evident from a conical nozzle, for example a 30% increase in entrainment of secondary flow, and also provide a reduction in compression ratio of between 15% and 50%. In a conventional cone-shaped nozzle, the jet is ejected with massive momentum, carrying huge energy and creating noise. However, in the preferred nozzle configurations, the jet is spread and assimilated into the cold atmosphere more quickly, making the jet quieter and improving the 'push' provided by the propelling nozzle. Potentially, this could lead to a reduction in sound of between 25% and 35%.

The tip ring nozzle may comprise a divergent nozzle having a circular ring protruding at the exit of a conical nozzle. In particular, the tip ring nozzle may comprise a convergent-divergent nozzle, at the internal periphery of the outlet of the divergent nozzle section there may be provided an annular protrusion extending into the flow, the protrusion having a form that may be substantially ring-like (e.g. donut-shape or toroidal), and extending into the flow from the interior of the divergent nozzle section by approximately 5% of the radius of the divergent nozzle section outlet (e.g. between 2% and 10%, in particular between 4% and 8%, for instance 5 to 7%.

The elliptic sharp tipped shallow (ESTS) lobed nozzle may have elliptic lobes with relatively sharp tips (e.g. forming a cusp between the lobes), the tips protruding only a relatively short distance into the flow). In particular, they may project between approximately 5% and 20% of the radius of the nozzle outlet, more particularly between approximately 7% and 15%, for example 10%. The ESTS lobed nozzle may comprise a conventional lobed nozzle modified to have lobes with an elliptical cross-section projecting radially outward, and with cusps defining the join between adjacent elliptical regions, the cusps projecting inwardly from the interior wall of the divergent nozzle section by between approximately 5% and 20% the radius. In some arrangements, substantially the entire divergent nozzle section has such a cross-sectional form. In preferred embodiments, the nozzle may comprise four lobes; however, three, five, six or more lobes are also envisaged. The ESTS lobed nozzle may comprise a convergent-divergent nozzle.

The propelling nozzle may comprise aluminium alloy.

According to a second aspect of the invention, there is provided a method of reducing vehicular drag, the method comprising the steps of: providing vehicle according to any preceding claim; and expelling gas from the at least one nozzle into the at least one region.

Alternators in motor vehicles are typically driven by the crankshaft, which converts the reciprocal motion of a piston into circular movement. Some early model vehicles used a separate drive belt from the crankshaft pulley to the alternator pulley, but most cars today have a serpentine belt, or one belt that drives all components that rely on crankshaft power. However, as more power is drawn from the crankshaft to operate such 'accessory components', the net or effective power output of the engine decreases for producing useful work such as for locomotion.

According to a third aspect of the present invention, there is provided an engine system, comprising: an internal combustion engine having an intake and an exhaust; a turbine connected to the exhaust such that the turbine rotates in response to receiving exhaust gases from the engine; and an alternator connected to the turbine such that the alternator generates electrical power in response to rotation of the turbine.

In this way, the engine is not required to drive the alternator directly, for instance with a crankshaft, thus the alternator does not draw power from the engine, which would otherwise reduce the power available from the engine for locomotion. In contrast, according to the present invention, the alternator is driven by the exhaust gases leaving the engine, which allows all power generated by the engine (and fed into the crankshaft) to be used for primary purposes, such as locomotion. Hence, for a given desired power output of an engine, a smaller (therefore lighter), and potentially more efficient, engine may be used, as the net power output will be higher than that of a conventional engine in which the alternator is connected to the crankshaft.

Exhaust gases from an internal combustion engine are typically at higher temperature and/or pressure than ambient. The turbine may be configured to operate as a turbo-expander, such that the relatively high-pressure exhaust gas is expanded to produce work (i.e. to rotate the turbine). In doing so, thermal energy from the exhaust gas is extracted and converted to rotational energy of the turbine; that is, as the exhaust gas expands through the turboexpander, the temperature of the exhaust gas drops as heat energy is converted to rotational kinetic energy of the turbine (e.g. rotation of an impeller or rotor).

The turbine may be any form of known turbine. The turbine may comprise an impulse type turbine, for instance a Pelton wheel turbine, for extracting energy from the impulse of the moving fluid. Alternatively or additionally, the turbine may be a reaction type turbine. The turbine may have a multi-blade construction. For instance, the turbine may comprise a double-blade turbine. The turbine may have only one turbine stage, or a plurality of turbine stages (e.g. two stages). Each turbine stage may be of a similar type, or may differ from some or all other stages. The turbine or impeller may be, for instance, an aluminium alloy, that may be selected to resist the high temperature and pressures encountered within the fluid flow; however, other constructions are also contemplated, such as ceramics and/or other metals. The turbine may comprise bearings (for instance low-friction bearings, such as polymer bearings) upon which an impeller or rotor rotates.

In addition, exhaust gases from an internal combustion engine typically have a relatively high velocity; that is exhaust gases from the internal combustion engine (expelled from the cylinder) are not usually vented to ambient immediately, but are rather conveyed along an exhaust pipe. The pressure of exhaust gases from the cylinder pushes exhaust gasses within the pipe, such that the exhaust gases obtain a velocity through the pipe. In the present invention, the turbine may be arranged to receive such exhaust gases having a velocity, and may be configured to extract kinetic energy due to their velocity. In this way, a ram pressure due to a velocity of the exhaust gases relative to the turbine may be present on the turbine, and the turbine may use this ram pressure to extract kinetic energy from the flowing exhaust gases, and convert it into rotational kinetic energy of the turbine.

A reduction in pressure and/or velocity of the exhaust gases across the turbine may act to reduce the amount of sound energy in the exhaust gases. In particular, the turbine may be configured to convert some sound energy in the exhaust gases into kinetic energy. The turbine may be configured or further configured to dampen incoherent vibrations within the exhaust gases, thereby reducing volume of any sound from the exhaust gases.

The turbine may be configured to rotate at a predetermined RPM in response to receiving exhaust gas from the engine, for instance above approximately 2000 rpm, between approximately 2500 and 8000, in particular between approximately 3000 and 6000 rpm, more particularly between approximately 3500 and 5000 rpm (e.g. approximately 4000 or 4500 rpm). In this way, no gearbox is required between the turbine and the alternator to generate desired electrical power at the alternator. Further, as the alternator is connected to the turbine rather than a crankshaft of the engine, no gearing is required between the crankshaft and the alternator, thus allowing smaller and lighter overall engine size.

Configuring the turbine to rotate at a predetermined RPM may include using a wastegate on the exhaust, to limit the upper rotational speed of the turbine by removing a portion of the exhaust gases from the exhaust before interaction with the turbine, and/or selecting a suitable turbine blade configuration (including angle of attack), using conventional methods.

The alternator may be connected to the turbine in any manner known to those skilled in the art similar to the manner in which alternators are conventionally connected to a crankshaft of an engine, for instance by belt, chain or gears.

The alternator may be spaced from the engine, for instance by more than 25 cm, 50 cm, 1 m, 2 m, etc. In this way, performance and handling of a vehicle may be improved by selecting appropriate location (e.g. weight distribution) of engine system components (such as the engine and the alternator). The turbine may be connected to (e.g. in fluid communication with) the exhaust by an exhaust pipe. In particular, the turbine may be located at substantially any location along an exhaust pipe from the engine, allowing the alternator, and optionally the battery, to be similarly located.

The turbine may be connected to at least one further piece of accessory equipment, including a water pump, an air conditioning compressor, and/or an air pump.

The air pump may be a rotary vane pump, reciprocating (piston) compressor, or any other suitable form of pump or compressor. The air pump may pressurise air up to 600 kpa, 700 kpa, 800 kpa, 850 kpa, 900 kpa or 1 Mpa. The air pump may be constructed from aluminium alloy or any other suitable metal, ceramic, or carbon fibre. The air pump may comprise a non-return valve. The air pump may take in ambient air at a pump inlet and expel pressurised air to the exhaust outlet, or a distinct air outlet, for instance to a propelling nozzle, as described above. In this way, air may be compressed and sent to the exhaust/air outlet to eliminate vortices behind a vehicle in which the engine system is located.

In some embodiments, the air outlet may be connectable to pneumatic tyres of a vehicle in which the engine is located, such that inflation of the tyres may be effected. In particular, a hose may be connectable between the air outlet and the tyres, for instance manually. In some arrangements, the air outlet may be permanently connected to the tyres, and air flow into the tyres may be controllable by a selection switch (which may be manually operable, mechanical, electronic and/or automatic). In some embodiments, the hose may be connectable directly to a propelling nozzle, as described above, for instance via a push-fit connector, screw connector, expanding collar/collet connector or similar connection. In further embodiments, the air pump may be controllable to supply variable air pressures depending on the desired function; for instance, to inflate tyres, to eliminate vortices behind the vehicle and/or to supply air to the engine air intake.

The turbine may be connected to a compressor for delivering compressed gas to the intake, in the manner of a conventional turbocharger. In particular, the compressor may comprise the at least one further piece of accessory equipment, specifically the air pump. The compressor/air pump may have a dual function; specifically, to operate a turbocharger and/or an air outlet. The dual function may comprise a toggle switch for selecting between respective air and/or turbocharger functions, and/or balancing a proportion of pressurised air to be supplied respectively to the turbocharger and/or air outlet.

A metering valve may be provided between the compressor and the intake, to regulate the pressure of gas being provided to the intake. In this way, optimum operation of the engine may be achieved. The metering valve may be computer controlled; however, in alternative embodiments, the metering valve may incorporate some other form of feedback system, for instance a pressure regulated feedback system. The metering valve may comprise a mechanism for diverting a portion of gas from the compressor directly to the exhaust and/or exhaust outlet (i.e. bypassing the engine), which may be enabled in a similar manner to a conventional wastegate.

A pressure relief valve may be incorporated within the system to reduce a level of pressure in excess of a predetermined threshold pressure. The predetermined threshold pressure may be adjustable such that the pressure relief valve may be an adjustable pressure relief valve. Such pressure relief valves may be located at various points throughout the system, for instance immediately before the compressor, immediately after the compressor, immediately before the intake, between the compressor and the intake, immediately after the exhaust, immediately before the turbine, between the exhaust and the turbine, immediately after the turbine, immediately before the exhaust outlet, and/or between the turbine and the exhaust outlet.

After passing through the turbine, exhaust gases may be delivered to an exhaust outlet, which may be located on a rear of a vehicle in which the engine system is incorporated. A check valve may be provided between the turbine and the outlet, in order to regulate the amount of exhaust gas passed to the outlet, and may act as a downstream restrictor that may be controlled to optimise function of the turbine.

In particular, the exhaust/air outlet may comprise a propelling nozzle as described above. For instance, exhaust gasses (or gasses from the air outlet) are converted into a relatively high speed propelling jet by the propelling nozzle. The propelling nozzle may be configured to optimise operation of the turbine by functioning as a downstream restrictor. A vehicle incorporating the engine system described above may further comprise an exhaust outlet connected to the turbine, for removing exhaust gases that have been used to rotate the turbine. The exhaust outlet may be located on a rear of the vehicle such that the exhaust gases are expelled into a turbulent and/or low-pressure region behind the vehicle. In this way, the effect of form drag (due to the shape of the vehicle) can be minimised, by filling the turbulent and/or low-pressure region behind the vehicle with exhaust gases. Any air incident on the front of a vehicle that is taken into the engine (e.g. from a radiator grill) may be expelled immediately behind the vehicle, thereby reducing drag by means of symmetry.

According to a fourth aspect of the present invention, there is provided a method of generating electricity from an internal combustion engine, the method comprising the steps of: providing an internal combustion engine having an intake and an exhaust; providing a turbine connected to the exhaust; rotating the turbine in response to receiving exhaust gases from the engine; providing an alternator connected to the turbine; and generating electrical power with the alternator in response to rotation of the turbine.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

Figure 1:
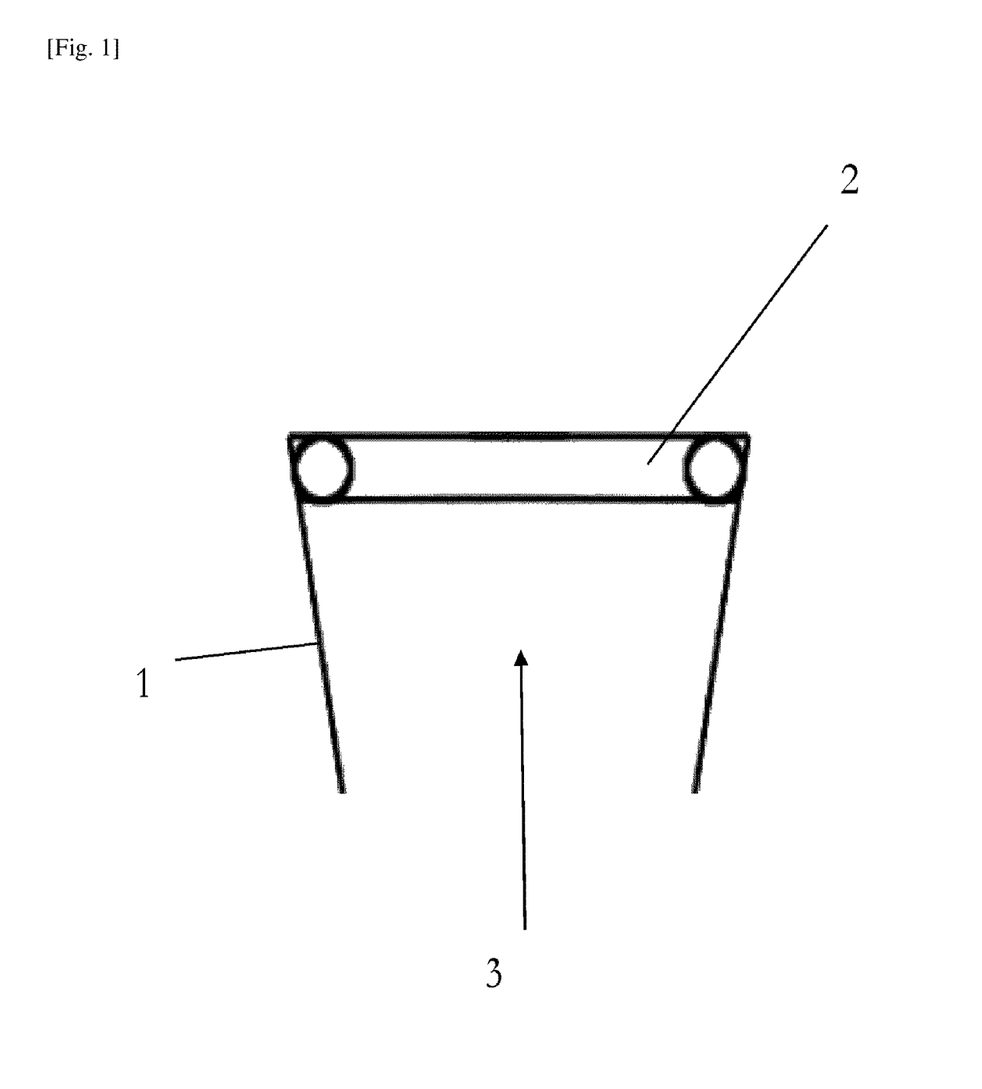
FIG. 1 is a longitudinal cross section through an outlet of a tip ring nozzle.

FIG. 1 is a longitudinal cross section through an outlet of a tip ring nozzle 1, having an annular band 2 located around the interior of the outlet of the nozzle, the annular band 2 having an approximately circular cross section, and being curved around on itself to form a substantially toroidal shape. The arrow 3 indicated direction of flow of gas through the divergent part of the nozzle. Preceding parts of the nozzle (for instance, a convergent section) are not shown for clarity.

Figure 2:
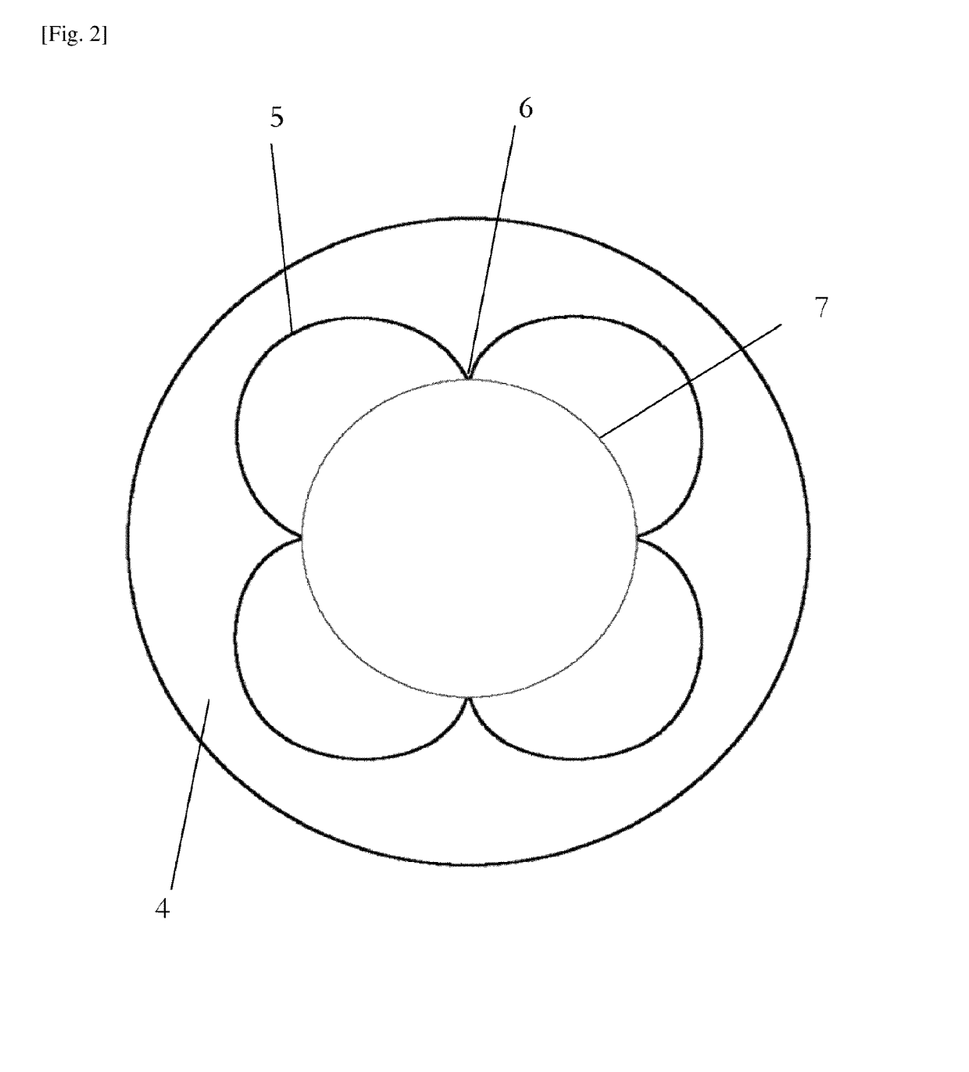
FIG. 2 is an end on (axial) view of an outlet of an elliptic sharp tipped shallow lobed nozzle.

FIG. 2 is an end on (axial) view of an outlet of an elliptic sharp tipped shallow lobed nozzle 4. The nozzle 4 has an interior profile 5 in the form of four equally spaced lobes, each separated by a sharp wall 6. The inlet 7 of the nozzle 4 is shown as an opening of reduced diameter, which may form the throat of the nozzle. The inlet 7 may comprise the connection between a converging portion of the nozzle (not shown) and the diverging portion of the nozzle 4. Therefore, the skilled person will appreciate that the degree by which the cross section of the nozzle differs from circular increases from the inlet 7 to the outlet interior profile 5.

Figure 3:
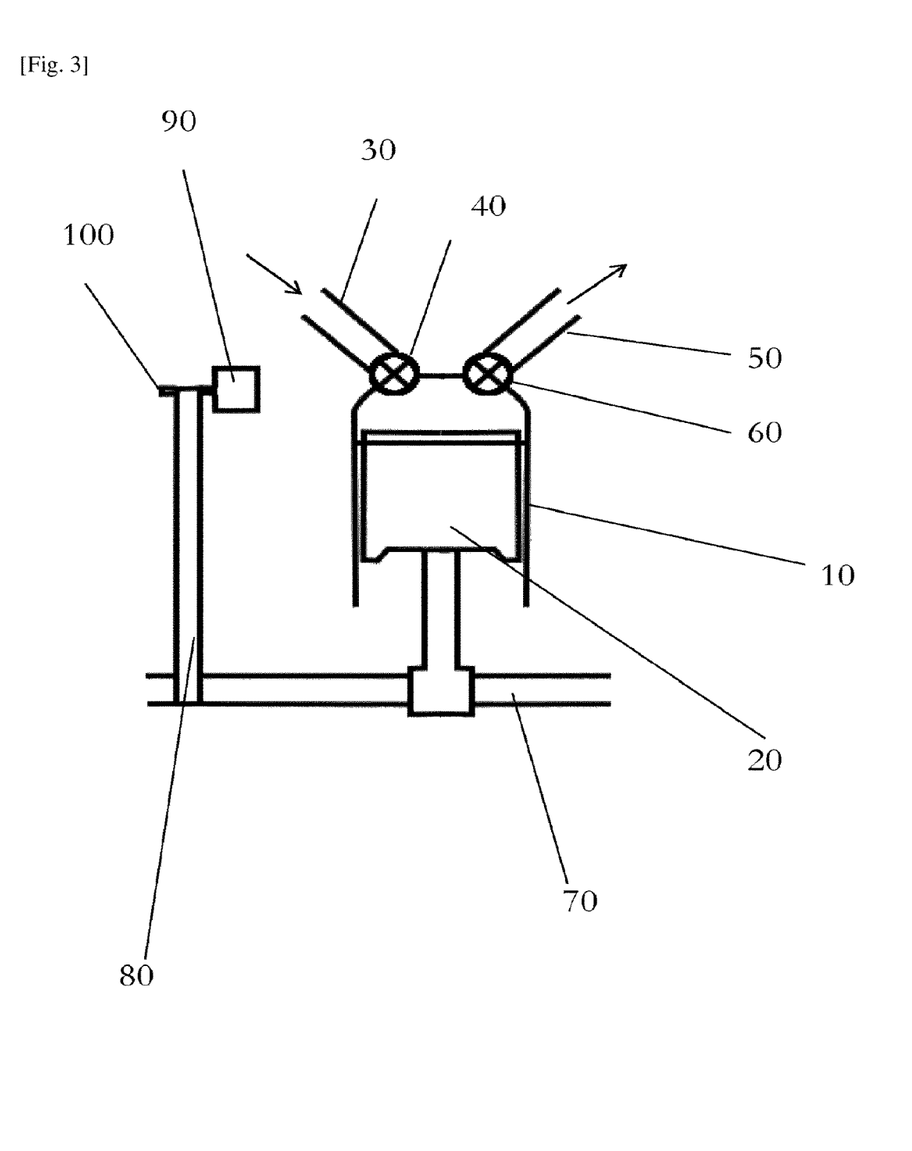
FIG. 3 is schematic representation of a typical prior art internal combustion engine and alternator system.

FIG. 3 is schematic representation of a typical prior art internal combustion engine and alternator system. An internal combustion engine is provided with a cylinder 10, a reciprocating piston 20 therein, an intake 30, an intake valve 40 (for controlling flow of gas into the engine through the intake 10), an exhaust 50, and an exhaust valve 60 (for regulating flow of exhaust gas out of the engine through the exhaust 50).

Operation of the internal combustion engine, the details of which are not shown for clarity, causes the piston to reciprocate, thereby rotating a crankshaft 70. Rotation of the crankshaft 70 is used to drive a belt 80 which in turn operates alternator 90 via alternator pulley 100. The alternator pulley 100 is sized relative to the crankshaft 70 such that a higher rpm is provided at the alternator 90 that is present at the crankshaft 70. That is, the piston 20 must do work operating the alternator 90.

Figure 4:
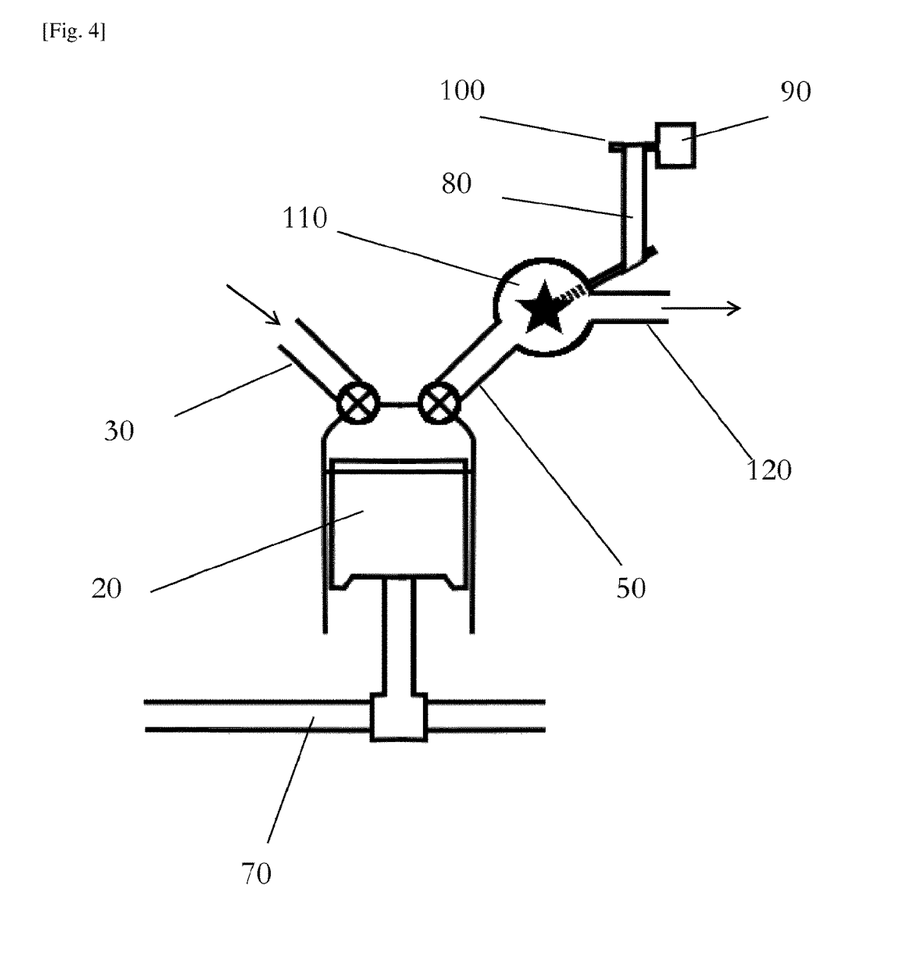
FIG. 4 is a schematic representation of a first embodiment of the present invention.

FIG. 4 is a schematic representation of a first embodiment of the present invention in which the prior art shown in FIG. 3 is modified in the following way. A turbine 110 is placed at the exhaust 50 such that exhaust gases from the engine rotate the turbine. Subsequently, such gases may leave the turbine via the exhaust outlet 120. The belt 80 is coupled to an axle of the turbine 110, rather than to the crankshaft 70, thereby reducing the load on the piston 20. The alternator 90 is driven by the belt 80, via the alternator pulley 100 as before.

However, the turbine 110 is constructed to provide a rotational speed suitable for the alternator 90, such that gearing provided by selecting suitably sized pulleys for use with the belt 80 are not required. In an alternative embodiment, it is envisaged that the alternator 90 could be connected directly to the axle of the turbine 110, foregoing the need for the belt 80 and alternator pulley 100.

Figure 5:
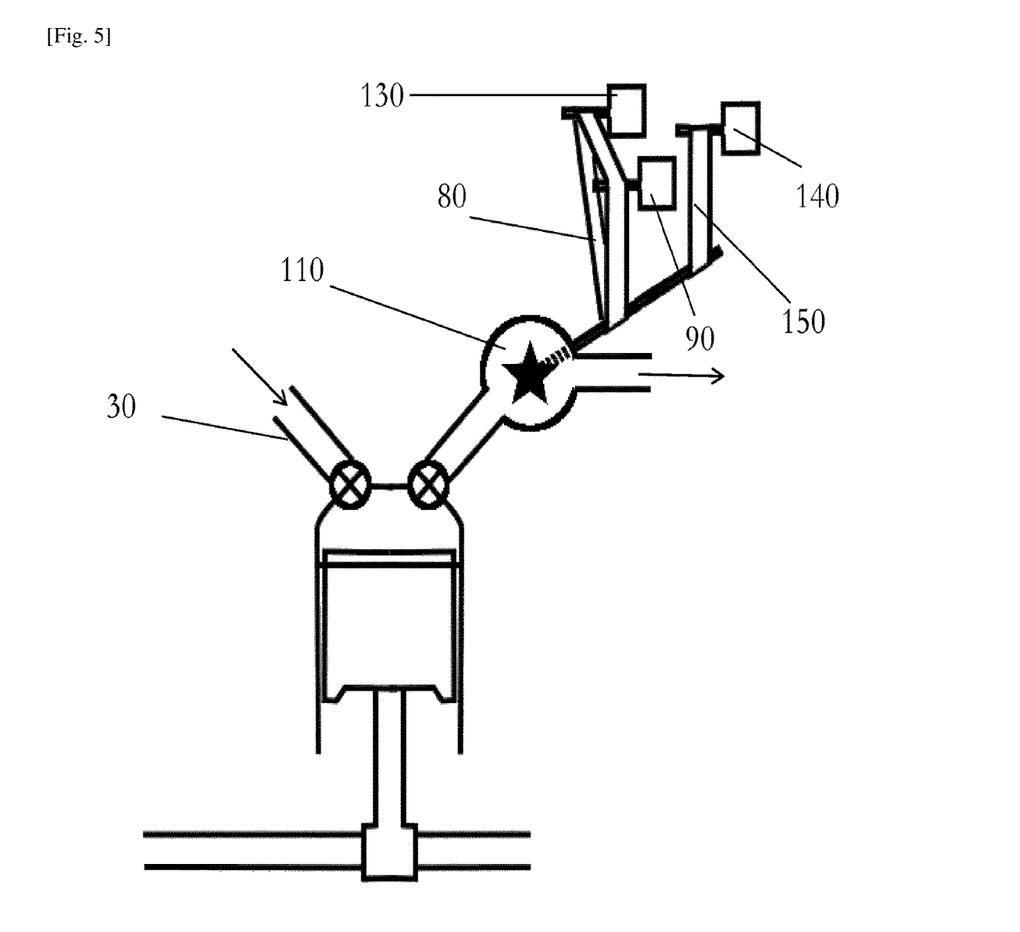
FIG. 5 is a schematic representation of a second embodiment of the present invention.

FIG. 5 is a schematic representation of a second embodiment of the present invention, which is a further modification of the first embodiment shown in FIG. 4. In this arrangement, the belt 80 drives the alternator 90 and additionally a further accessory device 130, such as an air conditioning compressor unit. A further accessory device 140 is driven by a further belt 150, also on the axle of the turbine 110. The further accessory device 140 could be a water pump, for example; however, any other component that would more typically be driven directly by the crankshaft.

Figure 6:
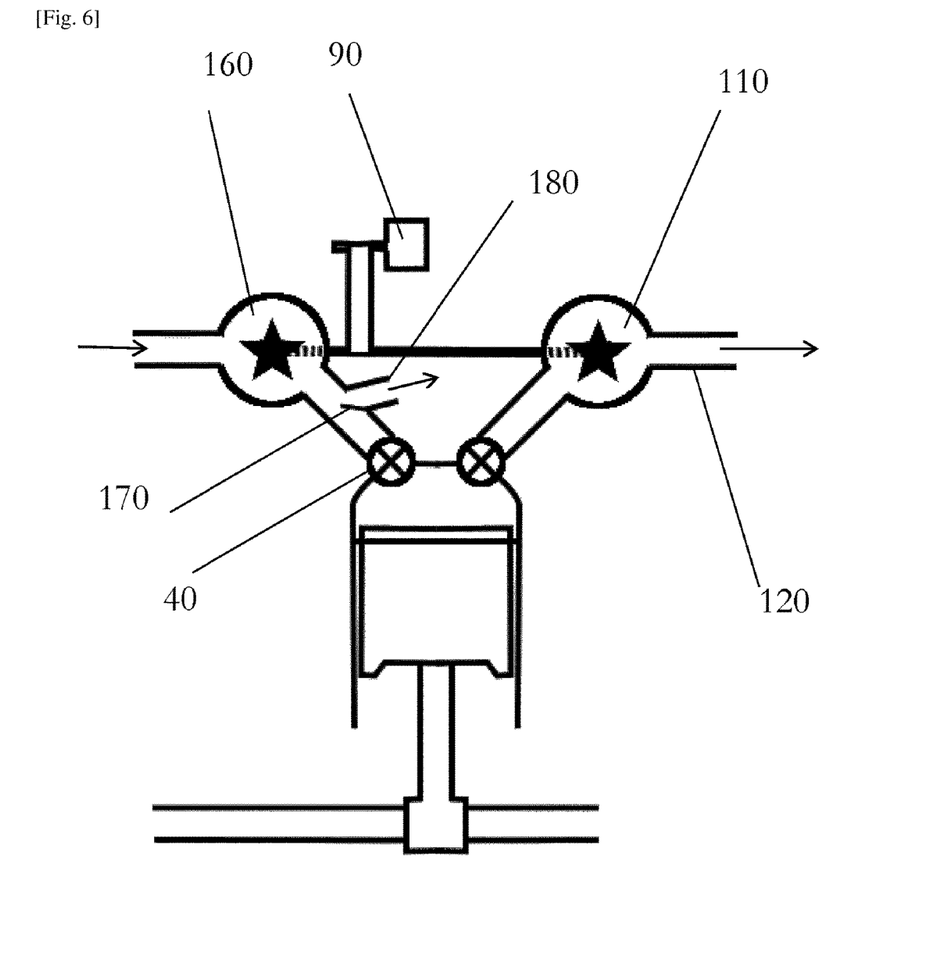
FIG. 6 is a schematic representation of a third embodiment of the present invention.

FIG. 6 is a schematic representation of a third embodiment of the present invention, which is an alternative or additional modification of the first embodiment shown in FIG. 4. The axle of the turbine 110 is made in common with an axle of a compressor 160 located at the intake, as is conventional in turbocharging devices. As in the other embodiments, the alternator 90 is driven by the axle of the turbine 110. A metering valve 170 is located between the compressor 160 and the intake valve 40 and is configured to direct a gas flow from the compressor away from the intake valve 40, in the event that the compression provided by the compressor exceeds some threshold amount. In some embodiments, the diverted gas 180 is conveyed to the exhaust outlet 120, or to other outlets such as the propelling nozzles discussed above. The metering valve 170 may divert all or none of the gas from the compressor 160, or any proportion therebetween.

Although exhaust gas may be conveyed to the propelling nozzles of the present invention, it is preferable that exhaust gas is simply expelled in a conventional manner. Gas from another source may be provided to the nozzles. In particular, exhaust gas would be useful because it is both hot and at relatively high temperature; however, it may also contain relatively large amounts of unburned hydrocarbons and other impurities, which could cause the nozzles to block/clog over time, or at least reduce their efficiency. It is therefore desirable to use the heat and/or pressure of the exhaust gas to provide suitable air flow through the propelling nozzle(s) of the present invention. For example, a heat exchanger could be used to reclaim waste heat, and/or a turbo expander could be used to extract pressure for re-use. The exhaust gas could then be passed to a silencer and/or exhaust pipe exit.

Figure 7:
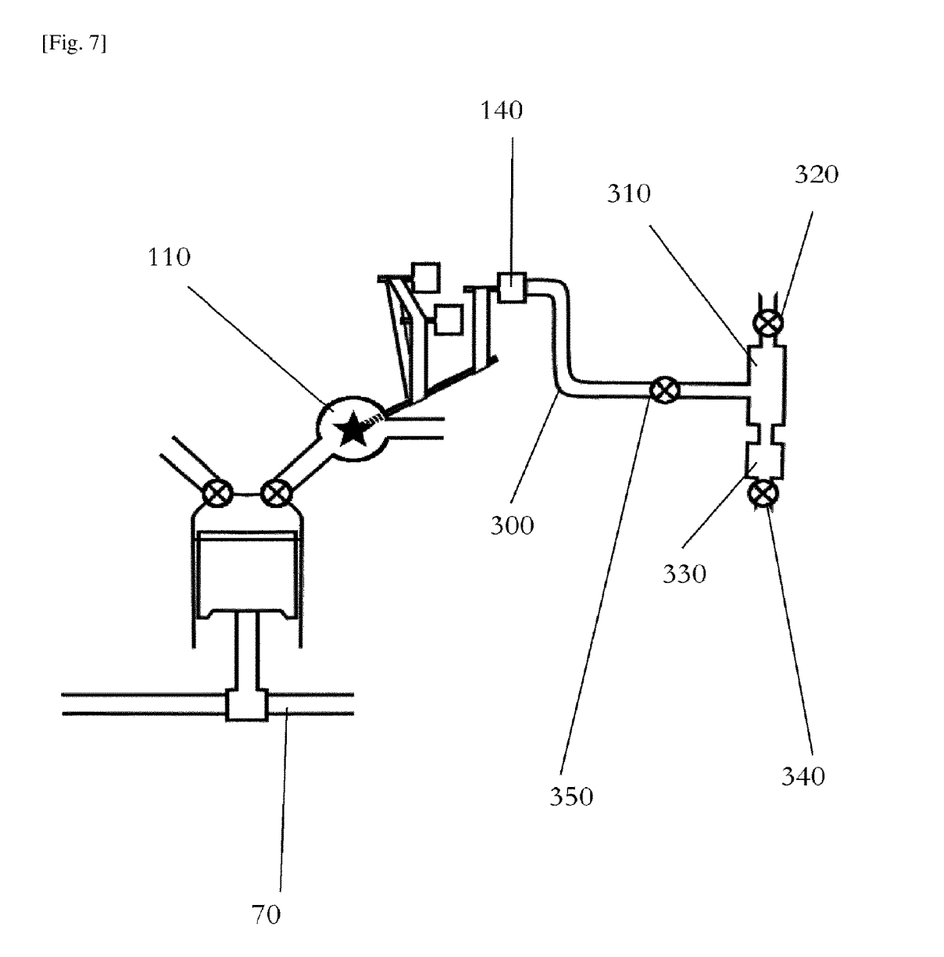
FIG. 7 is a schematic representation of a fourth embodiment of the present invention.

FIG. 7 is a schematic representation of a fourth embodiment of the present invention, in which an air compressor 140 is driven by the turbine 110 to produce a stream of compressed air (or other gas) that flows down a pipe 300. The air compressor 140 may take air from ambient, or in alternative embodiments may take air from the engine inlet via metering valve 170. The compressor may be, for instance, a vane type compressor.

This air compressed by the air compressor 140 may be supplied directly to the propelling nozzles and/or may be sent to a vortex tube 310 that splits the steam into a relatively high temperature stream that may be sent to a propelling nozzle via valve 320 and a relatively low temperature stream that may be sent to a propelling nozzle via valve 340. Optionally, a heater and/or cooler 330 may be placed in-line with either the hot stream or the cold stream, or exceptionally to the compressed air stream prior to its introduction into the vortex tube 310. A further check valve 350 may also be included in the pipe 300. Each check valve shown in the drawings may optionally be accompanied or replaced by a pressure sensor. A controller may be configured to operate the or each check valve in response to pressure measured by the pressure sensor(s). A fuel control unit may be associated with the or each pressure sensor and/or check valve.

It is to be appreciated that the arrangement in FIG. 7 could be modified such that the air compressor 140 is driven by the crankshaft 70, rather than via a turbine 110, in a configuration similar to that show in FIG. 3.

Figure 8:
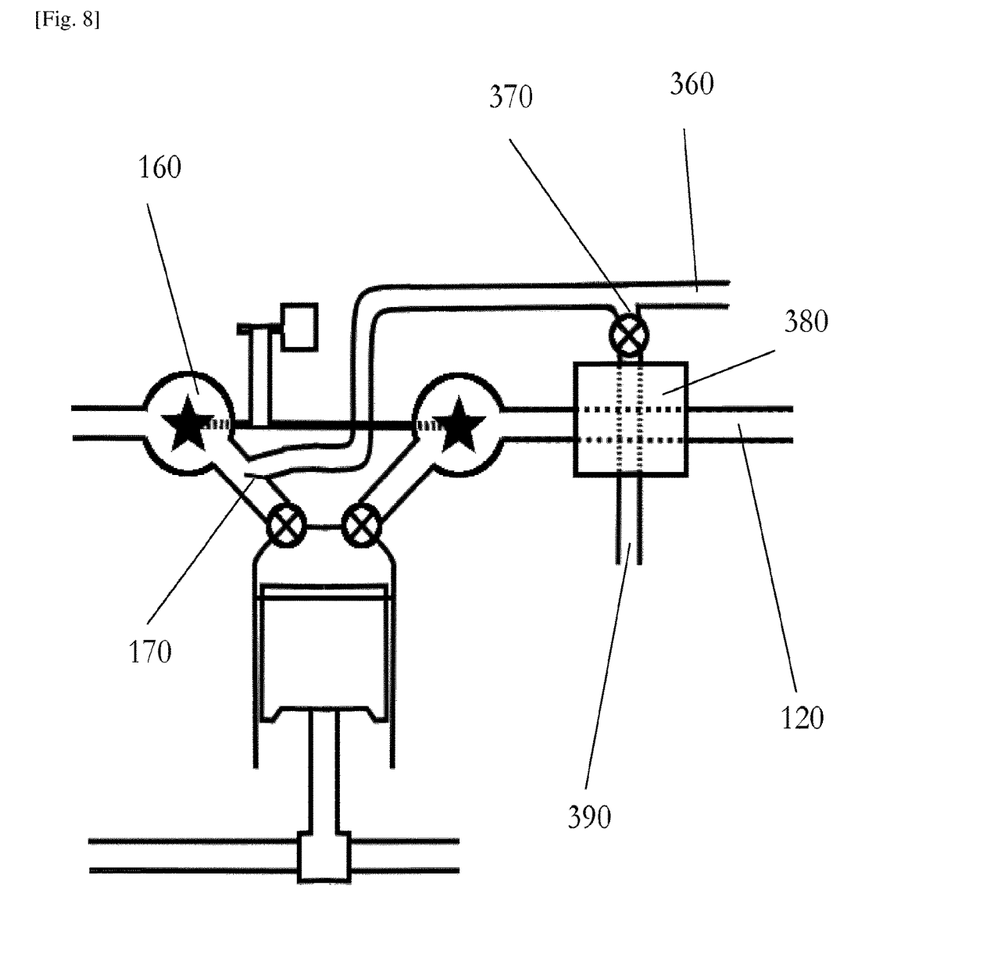
FIG. 8 is a schematic representation of a fifth embodiment of the present invention.

FIG. 8 is a schematic representation of a fifth embodiment of the present invention in which air flow from the metering valve 170 (compressed by the compressor 160) is supplied directly to the propelling nozzles via pipe 360 (conveying relatively cold air), and/or to a heat exchanger 380 via a check valve 370. The heat exchanger 380 may be configured to remove heat from the exhaust gases within the exhaust pipe 120 to warm the compressed air from the check valve 370 in order to provide a relatively high temperature stream 390 to a propelling nozzle, as described above.

Figure 9:
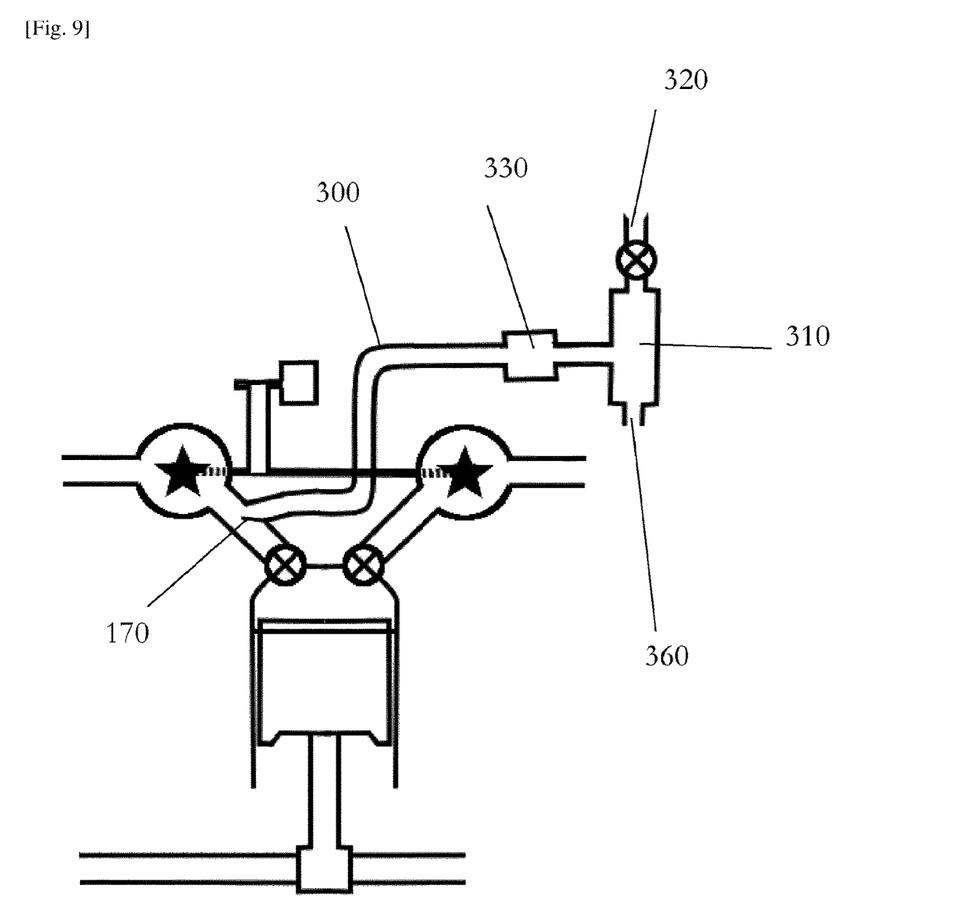
FIG. 9 is a schematic representation of a sixth embodiment of the present invention.

FIG. 9 is a schematic representation of a sixth embodiment of the present invention in which compressed air is taken from the metering valve 170 as in FIG. 8, but is conveyed to a vortex tube 310 as in FIG. 7. In particular, a cooler 330 is provided in the pipe 300 prior to the vortex tube 310.

Any combination of the above embodiments may be used to create a system having some or all of the advantages described above.

Figure 10:
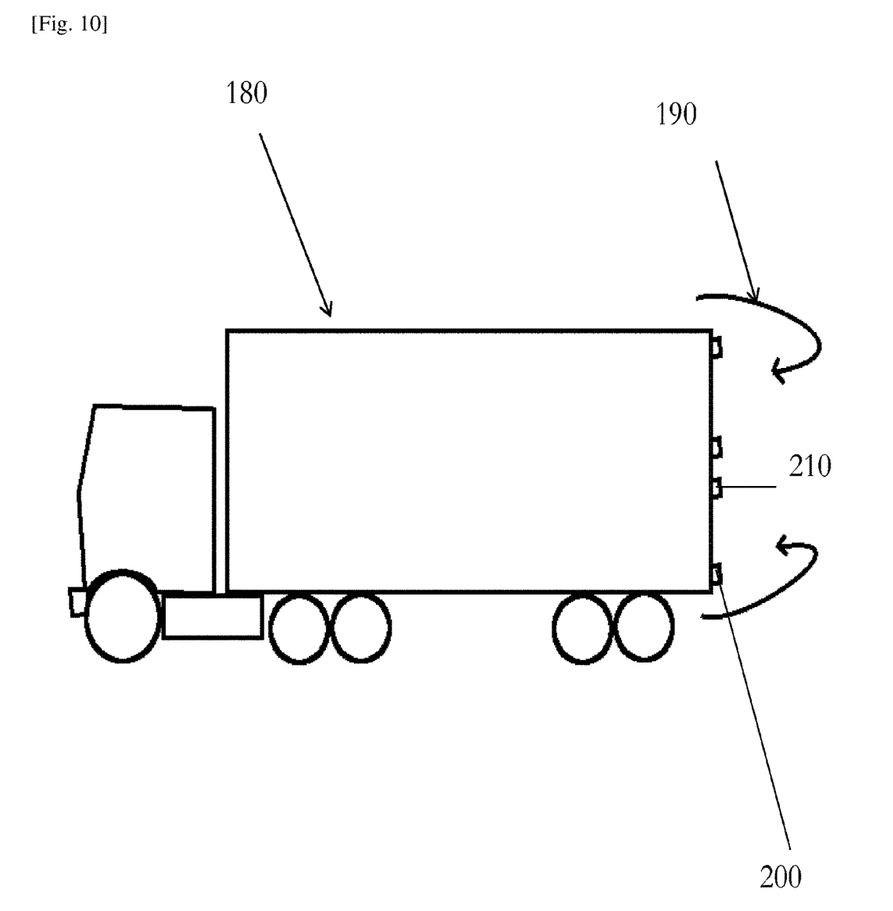
FIG. 10 is a schematic representation of an articulated lorry incorporating an embodiment of the present invention.

FIG. 10 is a schematic representation of an articulated lorry 180 incorporating an embodiment of the present invention. The lorry 180, when travelling forwards, suffers from drag, in particular form drag due to the substantially unstreamlined shape of the vehicle. Vortices 190 are formed in a low-pressure region behind the lorry 180, which contribute substantially to the form drag. The form drag could be reduces by streamlining the rear of the lorry 180; however, such an approach is undesirable because of the desire for the vehicle to allow easy access to its contents. First outlets 200 are provided on a periphery of the rear of the vehicle, and are specifically directed at the boundary of the vortex behind the vehicle. Second outlets 210 are provided on the rear of the vehicle spaced from the periphery, and are specifically directed into the low-pressure region behind the vehicle, in order to minimise drag by reducing vortices and thereby reducing resistance. These outlets are preferably nozzles of the form described above. In particular, the first outlets may be a convergent nozzles and/or a nozzles supplying relatively high temperature air, and the second outlets may be divergent nozzles and/or nozzles supplying relatively low temperature air. The figure shows two such outlets of each kind 200, 210; however, a single outlet, or multiple outlets (e.g. 3, 4, 5, 6, 10, 20, etc.) of each kind are also envisaged.

In some arrangements, the outlets may be located between the cabin of the articulated lorry 180 and the container body, or adjacent to any low pressure region and/or vortex produced by a similar moving vehicle, such as behind wheels. In further arrangements, the outlets may be located on a spoiler, or adjacent to a spoiler. In particular, the outlets on/adjacent to a spoiler may be convergent nozzles and/or a nozzles supplying relatively high temperature air. An actuator and force amplifier assembly may be incorporated (e.g. adjacent to the spoiler), which may receive compressed air at a first pressure and convert it to a different pressure in accordance with Pascal's law.

In some embodiments, the nozzle arrangement may be reversed such that relatively high temperature air is expelled into a high pressure region in front of the vehicle, which may be present due to ram forces. The relatively high temperature air may warm the high pressure region, encouraging it to expand and dissipate, thereby reducing form drag. In particular, in some specific embodiments, the nozzles may be directed toward relatively high pressure regions adjacent to the vehicle.

The invention claimed is:

1. A vehicle configured such that, when moving at a speed above a predetermined threshold speed, at least one region is formed adjacent to the vehicle, the at least one region having properties selected from the group comprising turbulent, low pressure, and combinations thereof, the vehicle comprising:
- at least one convergent propelling nozzle located adjacent to the at least one region;
- at least one divergent propelling nozzle located adjacent to the at least one legion; and
- a system for providing gas at a first temperature above ambient to the convergent nozzle for expulsion into the at least one region, and gas at a second temperature below the first temperature to the divergent nozzle for expulsion into the at least one region.

2. The vehicle of claim 1, wherein at least one of the propelling nozzles comprises an ejector nozzle.

3. The vehicle of claim 1, wherein at least one of the propelling nozzles comprises a supersonic ejector.

4. The vehicle of claim 1, wherein at least one of the propelling nozzles comprises a conical nozzle.

5. The vehicle of claim 1, wherein at least one of the propelling nozzles comprises a tip ring supersonic nozzle.

6. The vehicle of claim 1, wherein at least one of the propelling nozzles comprises an elliptic sharp tipped shallow lobed nozzle.

7. The vehicle of claim 1, wherein the at least one convergent nozzle is located adjacent to a boundary of the region.

8. The vehicle of claim 1, wherein the at least one divergent nozzle is spaced from a boundary of the region.

9. The vehicle of claim 1, wherein the system comprises a Ranque-Hilsch vortex tube configured to split gas into a first stream at the first temperature above ambient and a second stream at the second temperature below the first temperature, and configured to convey the first stream to the convergent nozzle and the second stream to the divergent nozzle.

10. A method of reducing vehicular drag, the method comprising the steps of:
- providing vehicle according to claim 1;
- expelling gas at the first temperature above ambient from the convergent nozzle into the at least one region; and
- expelling gas at a second temperature below the first temperature from the divergent nozzle into the at least one region.

* * * * *